(12) United States Patent
al-Rawaf et al.

(10) Patent No.: US 11,694,495 B1
(45) Date of Patent: Jul. 4, 2023

(54) SYSTEM AND APPARATUS FOR AUTOMATED SPORTING EQUIPMENT RENTALS

(71) Applicant: SurfUp, Inc., San Diego, CA (US)

(72) Inventors: Mishal Abdulaziz al-Rawaf, San Diego, CA (US); Jonathan Burris, San Diego, CA (US); Mazen Abugharbieh, San Diego, CA (US); Christian Jacques Hissom, Palomar Mountain, CA (US); Joshua O'Briant, San Diego, CA (US)

(73) Assignee: SurfUp, Inc., San Diego, CA (US)

( * ) Notice: Subject to any disclaimer, the term of this patent is extended or adjusted under 35 U.S.C. 154(b) by 0 days.

(21) Appl. No.: 17/676,957

(22) Filed: Feb. 22, 2022

Related U.S. Application Data

(60) Provisional application No. 63/154,769, filed on Feb. 28, 2021.

(51) Int. Cl.
| | | |
|---|---|---|
| *G07C 9/00* | (2020.01) | |
| *G06K 7/10* | (2006.01) | |
| *G06K 19/07* | (2006.01) | |
| *G06Q 30/0645* | (2023.01) | |
| *H04W 88/02* | (2009.01) | |

(52) U.S. Cl.
CPC ..... *G07C 9/00896* (2013.01); *G06K 7/10297* (2013.01); *G06K 19/0723* (2013.01); *G06Q 30/0645* (2013.01); *H04W 88/02* (2013.01)

(58) Field of Classification Search
CPC .......... G07C 9/00896; G06K 7/10297; G06K 19/0723
USPC ....................................... 235/385
See application file for complete search history.

(56) References Cited

U.S. PATENT DOCUMENTS

| | | | |
|---|---|---|---|
| 5,706,680 A | 1/1998 | Wroble | |
| 6,457,619 B1 | 10/2002 | Werner et al. | |
| 8,061,499 B2 | 11/2011 | Khairallah et al. | |
| 10,861,087 B2 | 12/2020 | Avello et al. | |
| 11,530,739 B2 * | 12/2022 | Nichols | F16H 15/28 |
| 2002/0174077 A1 | 11/2002 | Yui et al. | |
| 2010/0228405 A1 | 9/2010 | Morgal et al. | |
| 2010/0313614 A1 * | 12/2010 | Rzepecki | B62H 5/145 |
| | | | 70/233 |
| 2011/0010300 A1 * | 1/2011 | Audet | G06Q 30/06 |
| | | | 705/307 |
| 2011/0307394 A1 * | 12/2011 | Rzepecki | G06Q 30/0645 |
| | | | 705/13 |
| 2012/0196631 A1 * | 8/2012 | Fajstrup Axelsen | |
| | | | G06Q 20/3278 |
| | | | 340/5.5 |

(Continued)

FOREIGN PATENT DOCUMENTS

| | | |
|---|---|---|
| AU | 2017101038 | 8/2017 |
| WO | WO2020039369 | 2/2020 |

OTHER PUBLICATIONS

Wwebpage for kayakomat.com downloaded on Mar. 17, 2023.

*Primary Examiner* — Allyson N Trail
(74) *Attorney, Agent, or Firm* — Clause Eight; Michael Catania

(57) ABSTRACT

An apparatus and system for automated sporting equipment rentals is disclosed herein. The system comprises a station apparatus, sports equipment, and a mobile app. The sports equipment is locked within the station apparatus. The mobile application is configured to assign and unlock sports equipment from the station apparatus.

19 Claims, 13 Drawing Sheets

(56) References Cited

U.S. PATENT DOCUMENTS

| | | | |
|---|---|---|---|
| 2014/0265237 A1 | 9/2014 | Strother et al. | |
| 2014/0266588 A1* | 9/2014 | Majzoobi | B62H 5/20 |
| | | | 340/5.61 |
| 2015/0074004 A1 | 3/2015 | Song | |
| 2016/0241999 A1* | 8/2016 | Chin | G07C 9/00182 |
| 2017/0228817 A1* | 8/2017 | Brown | G06Q 30/0645 |
| 2018/0033311 A1 | 2/2018 | Berggren | |
| 2018/0330614 A1* | 11/2018 | Lin | G07F 17/0057 |
| 2019/0292815 A1* | 9/2019 | Hu | B62H 5/147 |
| 2021/0107579 A1* | 4/2021 | Adam | B60L 50/20 |
| 2022/0211224 A1* | 7/2022 | Harding | A47K 5/1217 |
| 2023/0012113 A1* | 1/2023 | Pearson | B62J 19/00 |

\* cited by examiner

SYSTEM AND APPARATUS FOR AUTOMATED SPORTING EQUIPMENT RENTALS

CROSS REFERENCE TO RELATED APPLICATION

The Present Application claims priority to U.S. Provisional Patent Application No. 63/154769, filed on Feb. 28, 2021, which is hereby incorporated by reference in its entirety.

BACKGROUND OF THE INVENTION

Field of the Invention

The present invention generally relates to automated sporting equipment rentals, and more specifically to automated surfboard rentals.

Description of the Related Art

A general problem with rental of sports equipment is the user ease of access to large and bulky sporting equipment proximate to sporting areas. Another problem is the high cost to manually staff and locate traditional rental offices in limited areas proximate to sporting areas, and difficulty of co-locating sporting rental businesses within hospitality establishments near users who seek sporting equipment.

The prior art has provided separately and often inconvenient rental locations staffed and conducted by manual processes to complete rental transactions.

General definitions for terms utilized in the pertinent art are set forth below.

APP is a software application for a mobile phone such as a smart phone.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself BLUETOOTH technology is a standard short range radio link that operates in the unlicensed 2.4 gigaHertz band.

BLUETOOTH LOW ENERGY (aka "BLE" or "BLUETOOTH LE") is a communication format from the Bluetooth Special Interest Group which uses the 2.4 gigaHertz band of BLUETOOTH technology but with a simpler modulation system that supports data pockets ranging from 8 to 27 octets, which are transferred at 1 Mbps.

FTP or File Transfer Protocol is a protocol for moving files over the Internet from one computer to another.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Media Access Control (MAC) Address is a unique identifier assigned to the network interface by the manufacturer.

RFID (radiofrequency identification) is the use of electromagnetic fields to identify and track an object bearing a tag (an antenna). There are passive RFID tags (antenna that is powered by interrogating radio waves) and active RFID tags (antennas powered by a battery).

SSID (Service Set Identifier) is a 1 to 32 byte string that uniquely names a wireless local area network.

Transfer Control Protocol/Internet Protocol ("TCP/IP") is a protocol for moving files over the Internet.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

Wireless AP (access point) is a node on the wireless local area network (WLAN) that allows wireless devices to connect to a wired network using Wi-Fi, or related standards.

PCT Publication WO2020/039369 for a Docking Station is one prior art solution.

U.S. Patent Publication Number 2019/0236691 for Apparatuses, Systems And Method For Watercraft Locking, Sharing And Rental is another prior art solution.

There should be a better solution to the difficulty and inconvenience of renting sporting equipment.

BRIEF SUMMARY OF THE INVENTION

One aspect of the Present Invention is a sporting equipment locker kiosk that communicates with a smart phone app to facilitate a rental transaction automatically (unmanned). The present invention provides a rental kiosk engineered to fit a small floor-plan with automation of the rental transaction through cellular connection to a user's phone with an application installed.

Another aspect of the present invention is a system for automated surfboard rentals. The system comprises a station apparatus, surfboards, and a mobile app. The station apparatus comprises a microcontroller, proximity sensors, RFID sensors, a wireless communication mechanism, a base and slots, with each slot comprising a bar. The surfboards are positioned within the station apparatus. Each surfboard comprises a RFID and a fin. The mobile application is configured to operate on a mobile device. The mobile application is configured to assign and unlock a surfboard of the plurality of surfboards from the station apparatus. Each proximity sensor is configured to detect a lock status. Each of the RFID sensors is configured to correspond and detect the RFID on each surfboard. An alternative embodiment utilizes an RFID sensor that is able to detect multiple RFID tagged items in the station, and detect distance to the tags to determine if objects are inside of the station and ready to rent, or outside of the station and ready to return.

Yet another aspect of the present invention is an apparatus for automated surfboard rentals. The apparatus comprises a microcontroller, proximity sensors, RFID sensors, a wireless communication mechanism, a base, and a slots. Each slot comprises a bar. Each slot is designed to retain a surfboard. The microcontroller is configured to receive a command from a mobile application to assign and unlock a surfboard from the apparatus. Each proximity sensor is configured to detect a lock status. Each RFID sensor is configured to detect a RFID on a surfboard.

Yet another aspect of the present invention is a system for automated sports equipment rentals. The system comprises a station apparatus, sports equipment, and a mobile app. The station apparatus comprises a microcontroller, proximity sensors, RFID sensors, a wireless communication mechanism, a base and slots, with each slot comprising a bar. The surfboards are positioned within the station apparatus. Each sports equipment comprises a RFID. The mobile application is configured to operate on a mobile device. The mobile application is configured to assign and unlock sports equipment from the station apparatus. Each proximity sensor is configured to detect a lock status. Each of the RFID sensors is configured to correspond and detect the RFID on each sports equipment.

Yet another aspect of the present invention is an apparatus for automated sports equipment rentals. The apparatus comprises a microcontroller, proximity sensors, RFID sensors, a wireless communication mechanism, a base, and slots. Each slot comprises a bar. Each slot is designed to retain sports equipment. The microcontroller is configured to receive a command from a mobile application to assign and unlock sports equipment from the apparatus. Each proximity sensor is configured to detect a lock status. Each RFID sensor is configured to detect a RFID on the sports equipment.

A main objective is to create a mechanism for automated sports equipment rentals.

Another objective is to provide equipment rentals locations close to their point of use.

Another objective is to encourage new users to adopt sports by simplifying access to the sporting equipment.

Yet another objective is to provide new amenities to hotels and other hospitality business establishments.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
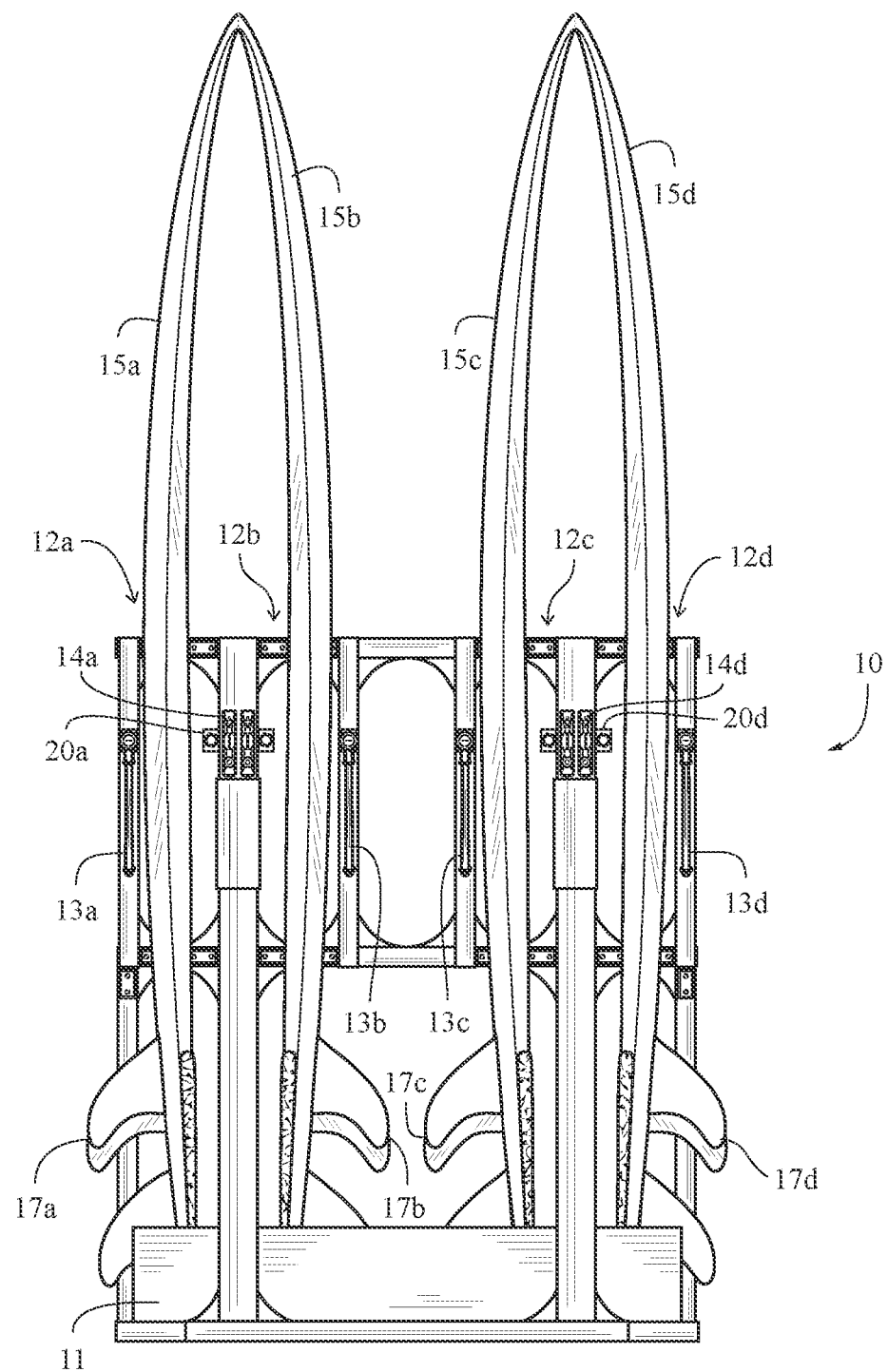
FIG. 1 is a front elevation view of an apparatus for automated sports equipment rentals with surfboards therein.
Figure 2:
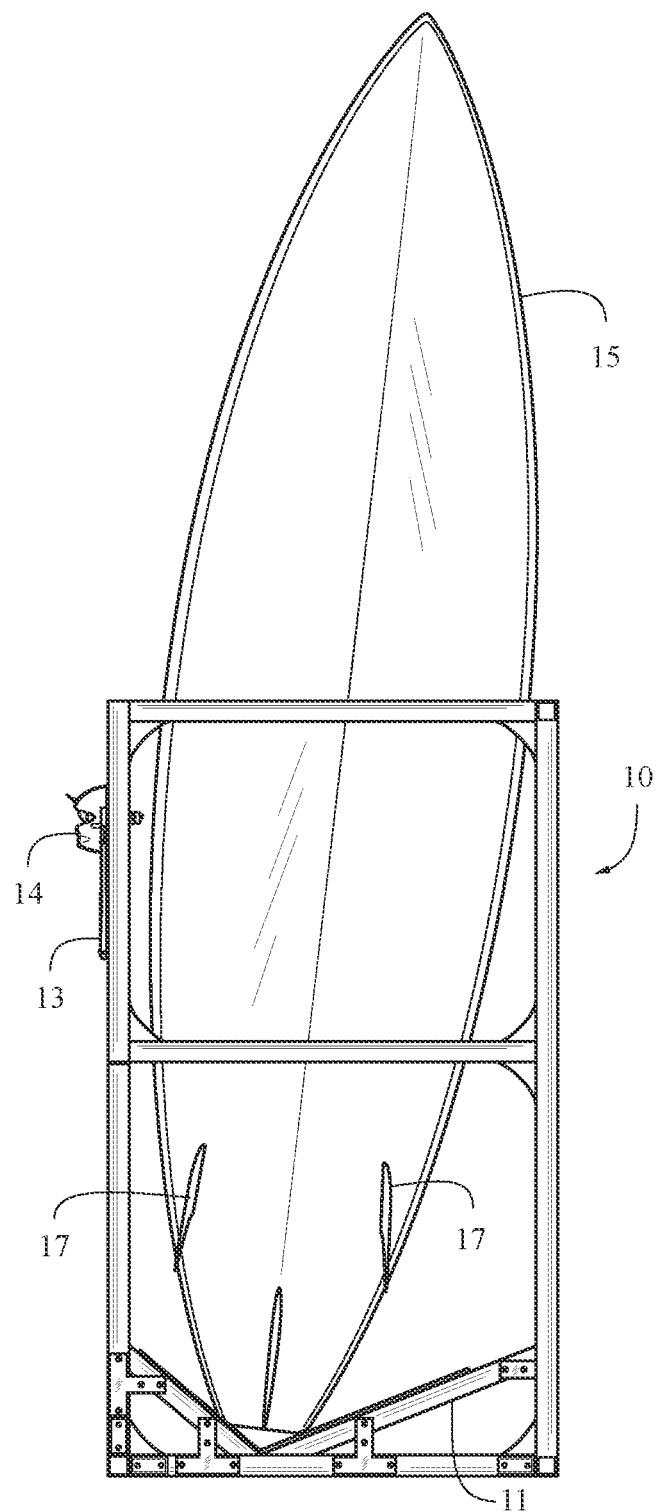
FIG. 2 is a side elevation view of an apparatus for automated sports equipment rentals with surfboards therein.
Figure 3:
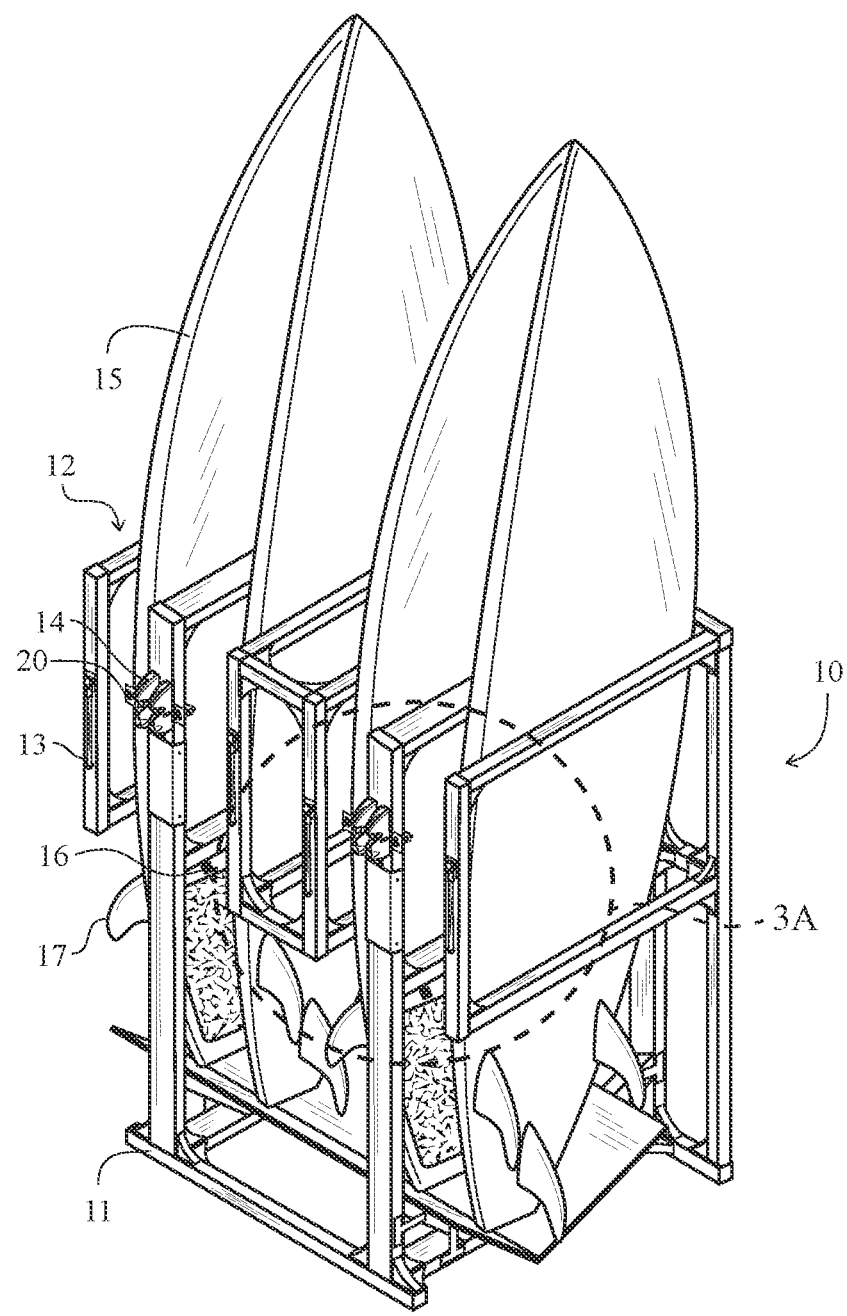
FIG. 3 is a top perspective view of an apparatus for automated sports equipment rentals with surfboards therein.

FIGS. 1-3 illustrate the apparatus 10 for automated sports equipment rentals holding surfboards 15.

Figure 8:
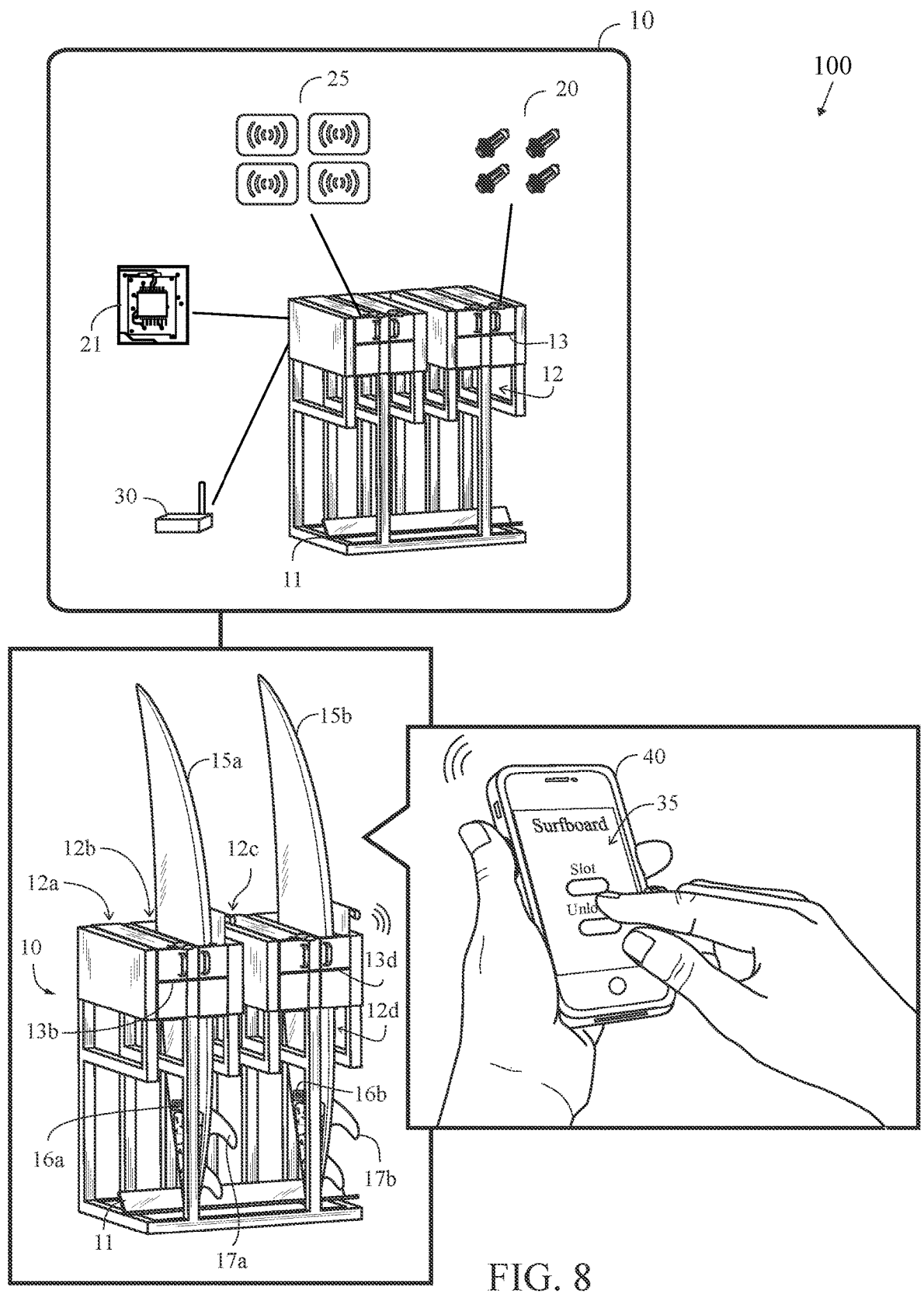
FIG. 8 is an illustration of a system of the present invention.

A preferred embodiment is a system 100 for automated surfboard rentals, as shown in FIG. 8. The system 100 comprises a station apparatus 10, surfboards 15, and a mobile app 35. The station apparatus 10 comprises a microcontroller 21, proximity sensors 20, RFID sensors 25, a wireless communication mechanism 30, a base 11 and slots 12, with each slot 12a-d comprising a bar 13. The station apparatus 10 can be permanently installed or mobile, e.g., placed inside or placed outside of a beachfront establishment or event location. The surfboards 15a-b are positioned within the station apparatus 10. Each surfboard 15a-b comprises a RFID 16a-b and a fin 17a-b. The mobile application 35 is configured to operate on a mobile device 40. The mobile application 35 is configured to assign and unlock a surfboard 15 of the plurality of surfboards 15a-b from the station apparatus 10. Each proximity sensor 20 is configured to detect a lock status. Each of the RFID sensors 25 is configured to correspond and detect the RFID 16 on each surfboard 15.

Figure 3A:
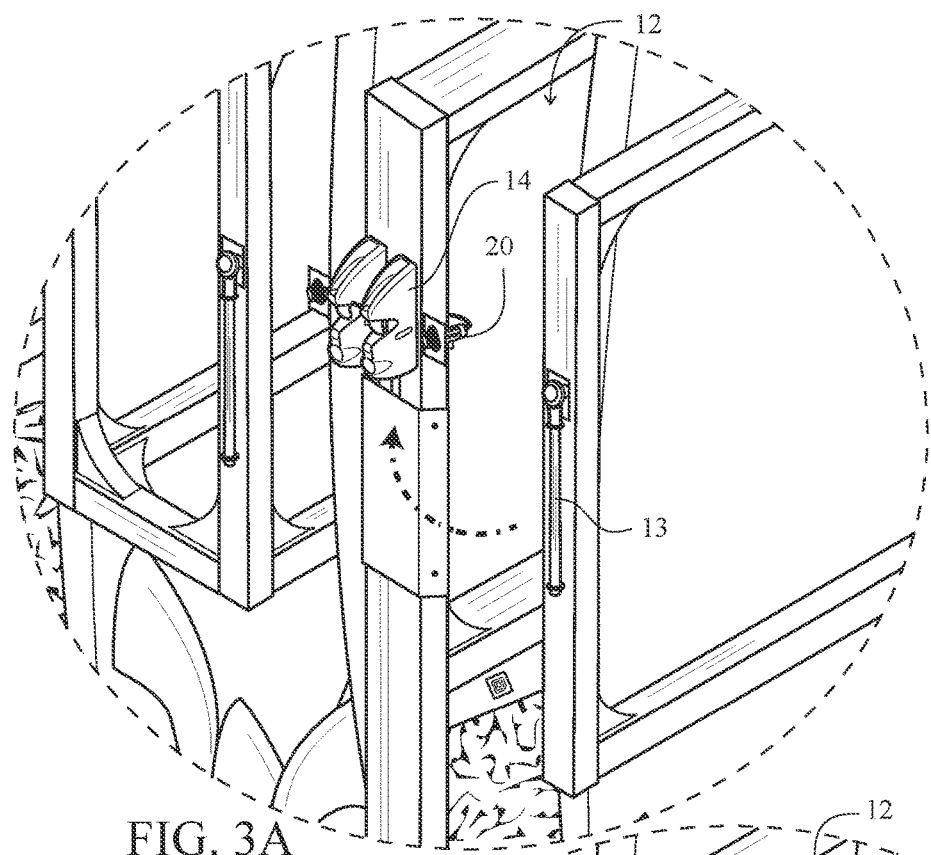
FIG. 3A is a detailed view of an open latch of an apparatus of FIG. 3.
Figure 3B:
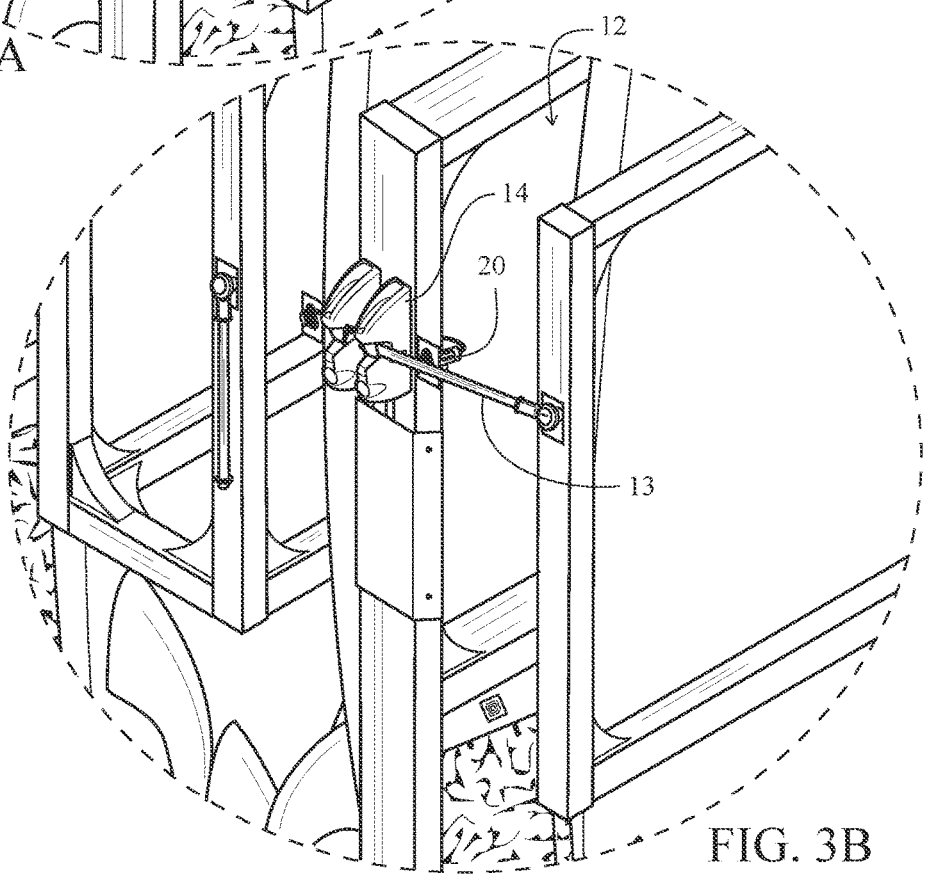
FIG. 3B is a detailed view of a closed latch of an apparatus of FIG. 3.

FIGS. 3A-3B illustrate a latch 14 in conjunction with a proximity switch 20. When the bar 13 is closed, the proximity switch 20 detects the locked status of a slot 12.

An alternative embodiment is an apparatus for automated surfboard rentals. The apparatus comprises a microcontroller, proximity sensors, RFID sensors, a wireless communication mechanism, a base, and slots. Each slot comprises a bar. Each slot is designed to retain a surfboard. The microcontroller is configured to receive a command from a mobile application to assign and unlock a surfboard from the apparatus. Each proximity sensor is configured to detect a lock status. Each RFID sensor is configured to detect a RFID on a surfboard. An alternative embodiment utilizes an RFID sensor that is able to detect multiple RFID tagged items in the station and detect the distance to the tags to determine if the objects are inside of the station and ready to rent, or outside of the station and ready to return.

An alternative embodiment is a system for automated sports equipment rentals. The system comprises a station apparatus, sports equipment, and a mobile app. The station apparatus comprises a microcontroller, proximity sensors, RFID sensors, a wireless communication mechanism, a base and slots, with each slot comprising a bar. The surfboards are positioned within the station apparatus. Each sports equipment comprises a RFID. The mobile application is configured to operate on a mobile device. The mobile application is configured to assign and unlock sports equipment from the station apparatus. Each proximity sensor is configured to detect a lock status. Each of the RFID sensors is configured to correspond and detect the RFID on each sports equipment.

An alternative embodiment is an apparatus for automated sports equipment rentals. The apparatus comprises a microcontroller, proximity sensors, RFID sensors, a wireless communication mechanism, a base, and slots. Each slot comprises a bar. Each slot is designed to retain sports equipment. The microcontroller is configured to receive a command from a mobile application to assign and unlock sports equipment from the apparatus. Each proximity sensor is configured to detect a lock status. Each RFID sensor is configured to detect a RFID on the sports equipment.

In an alternative embodiment, the system is installed at a retail shop (e.g., surf shop) with the components of the station, that can detect sports equipment (e.g., surfboards), that are not locked in an apparatus in the retail shop, and track rentals that are facilitated through a mobile app.

The sports equipment is at least one of paddle boards, kite boards, boogie boards, snow skies, water skies, kayaks, rafts, canoes, or any other large bulky sports equipment.

Figure 4:
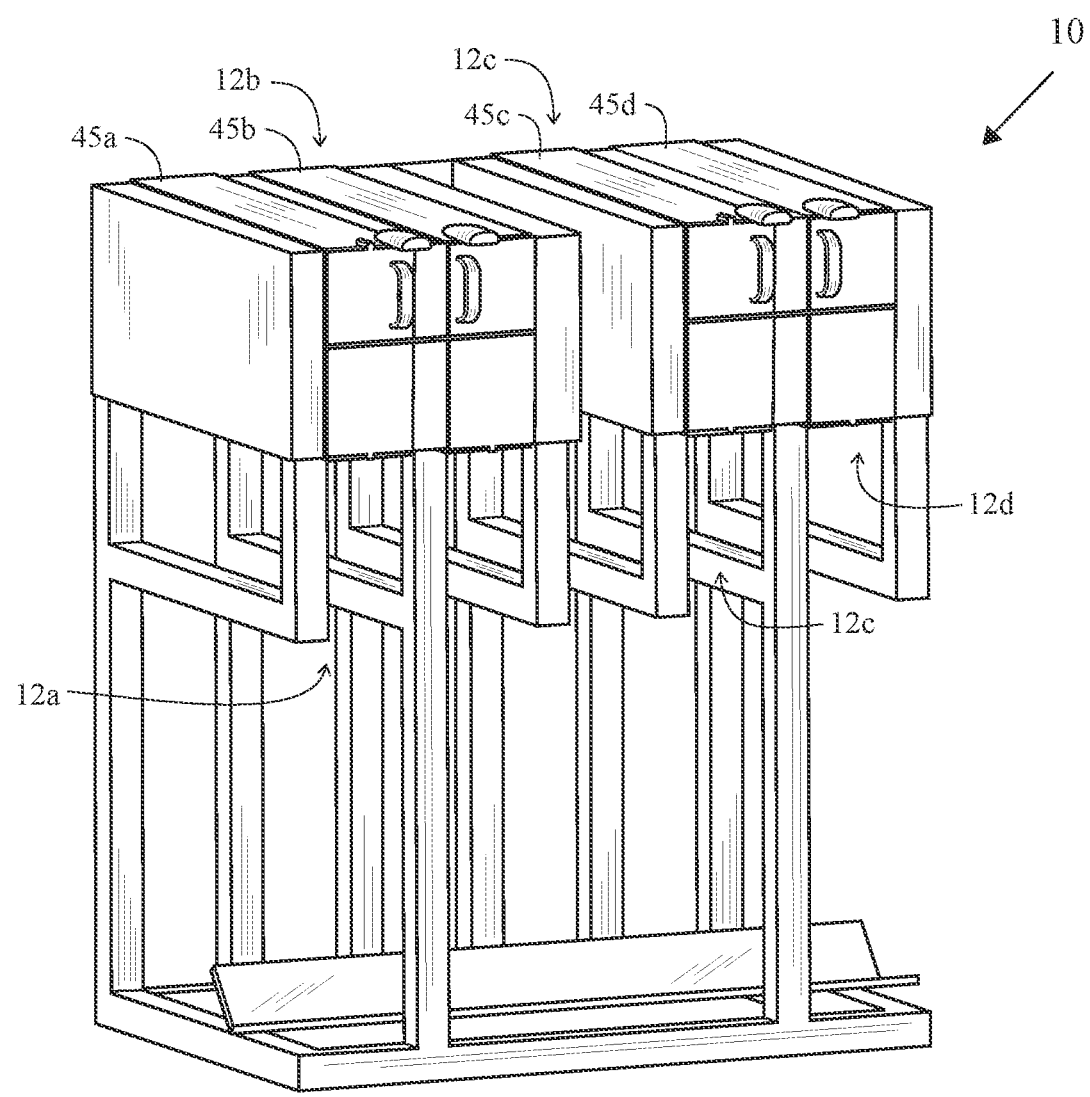
FIG. 4 is a top perspective view of an apparatus for automated sports equipment rentals with a locker kiosk.
Figure 4A:
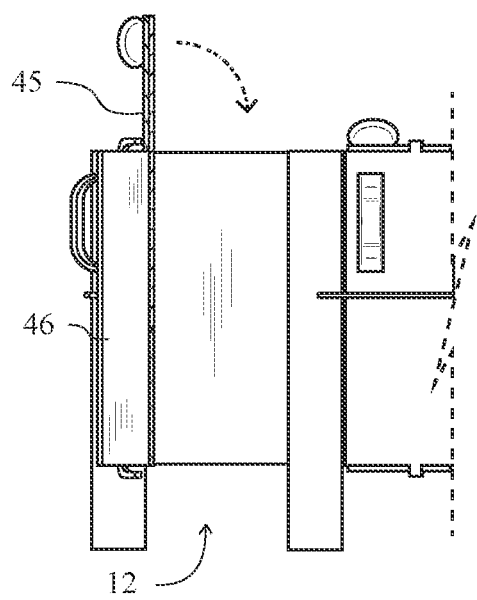
FIG. 4A is a partial view of a locker component.
Figure 4B:
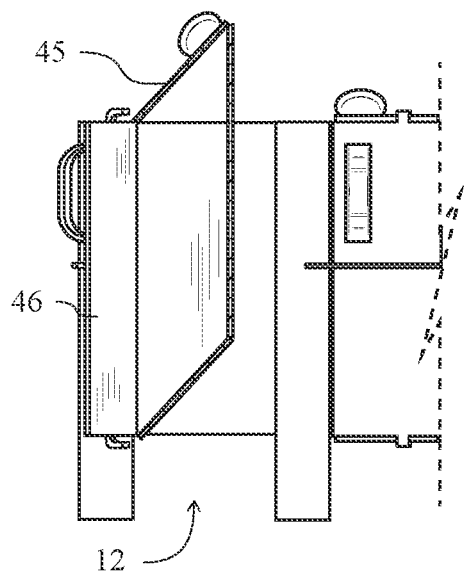
FIG. 4B is a partial view of a locker component.
Figure 4C:
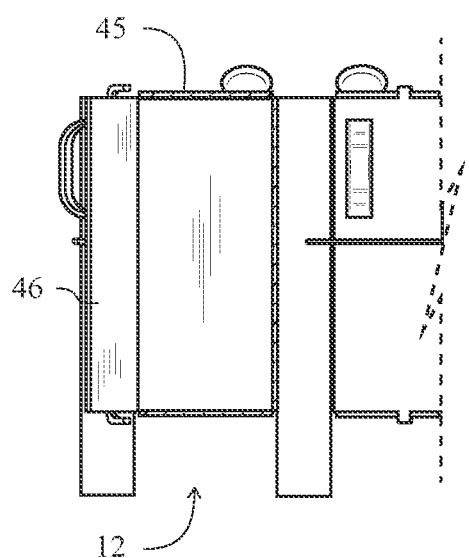
FIG. 4C is a partial view of a locker component.
Figure 5:
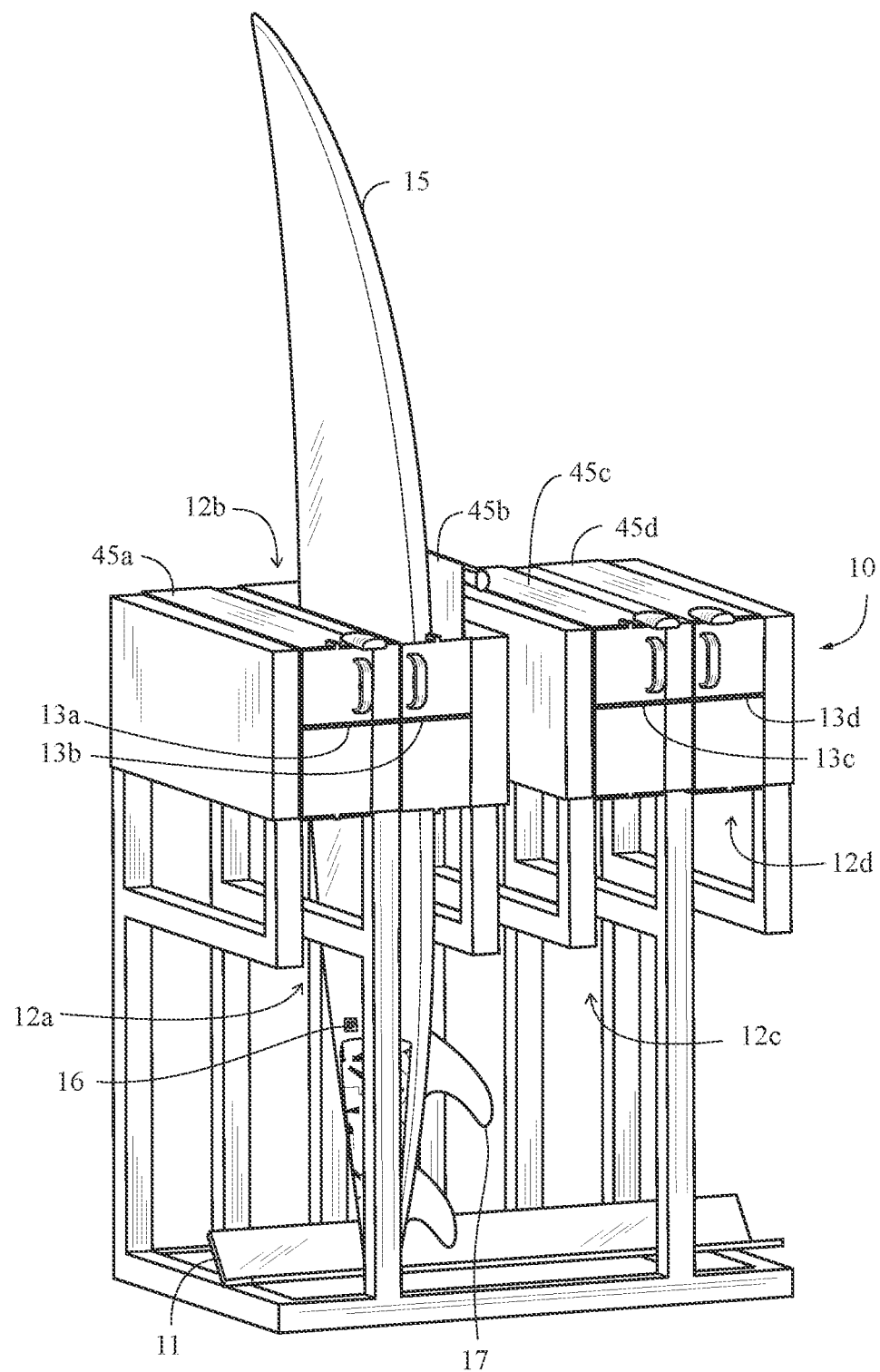
FIG. 5 is a top perspective view of an apparatus for automated sports equipment rentals with a locker kiosk and surfboards therein.
Figure 5A:
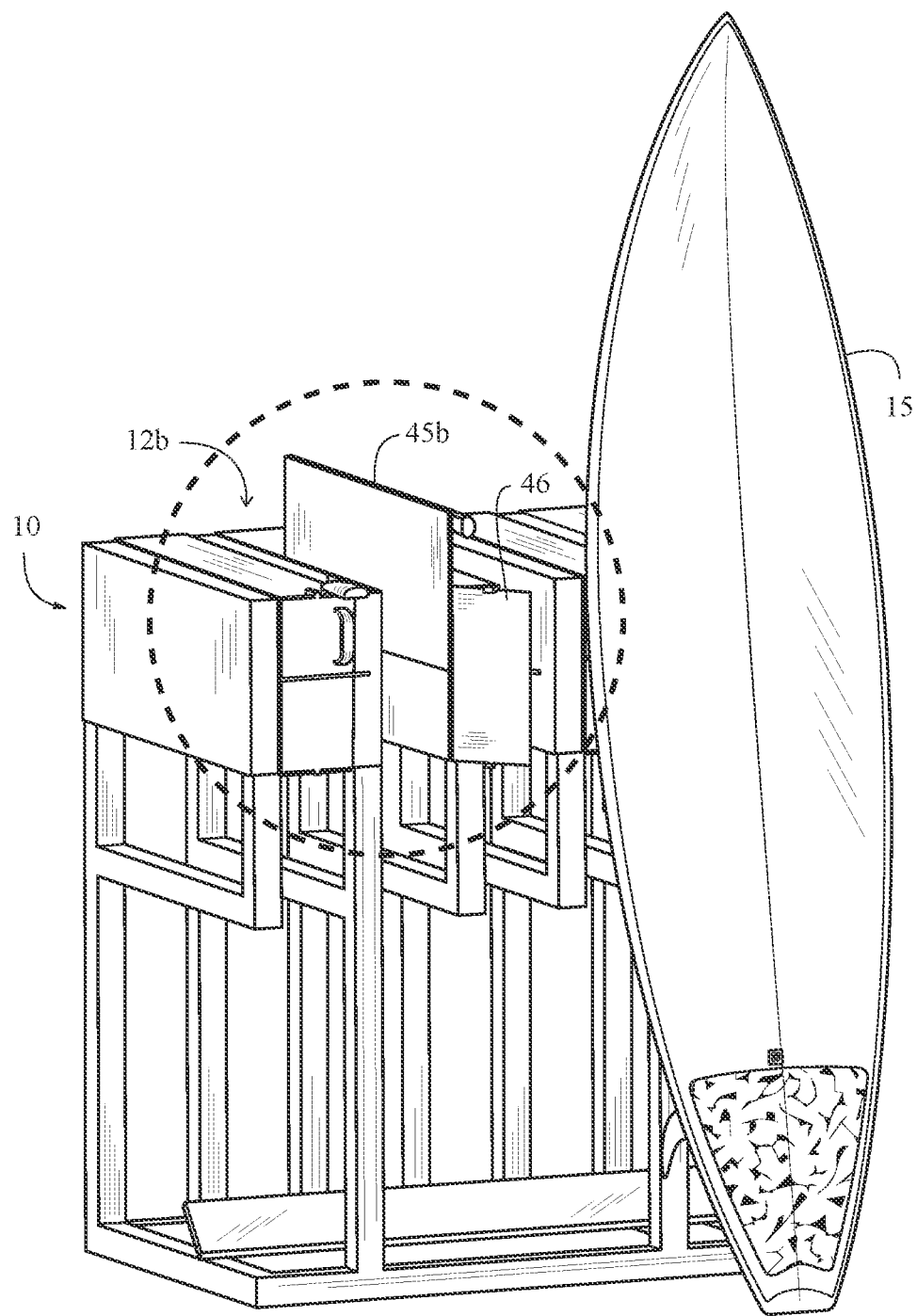
FIG. 5A is a top perspective view of an apparatus for automated sports equipment rentals with a locker kiosk and surfboard.
Figure 5B:
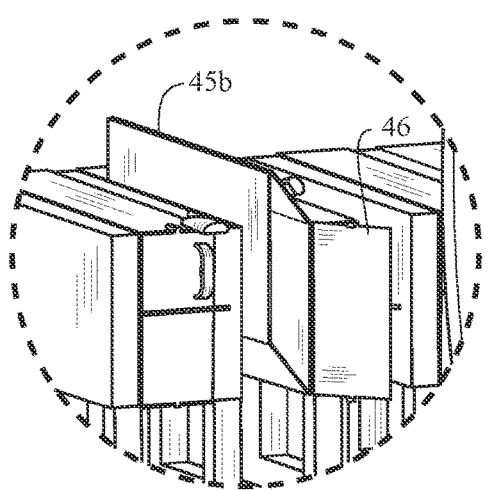
FIG. 5B is a partial view of the locker component of FIG. 5A.
Figure 5C:
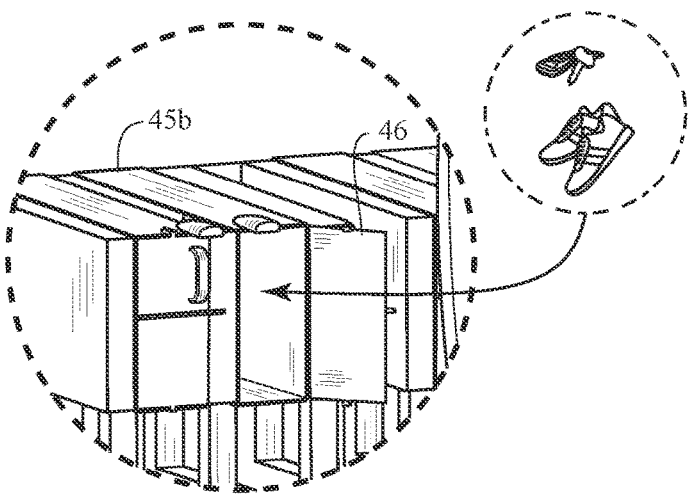
FIG. 5C is a partial view of the locker component of FIG. 5A.
Figure 5D:
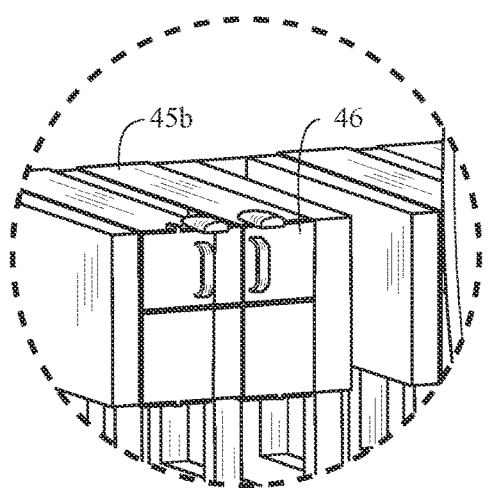
FIG. 5D is a partial view of the locker component of FIG. 5A.

The slots 12 are each convertible into customer storage lockers 45 when the sports equipment or surfboards are rented, as shown in FIGS. 4-5D. FIG. 4A shows the locker component 45 in a stowed upright position, also shown in FIGS. 5-5A with a surfboard 15 in place. FIG. 4B shows the locker 45 as it is brought down into place. FIG. 4C shows the locker 45 in place, ready to use. FIGS. 5-5D illustrate a rental process of the apparatus 10 with lockers 45. A surfboard is locked in an apparatus 10 within a slot 12b, ready to be rented, as shown in FIG. 5. A user rents out a surfboard 15 through the mobile app. The mobile app unlocks the door 46 of the assigned slot 12b and the surfboard 15 is removed. In FIG. 5B, the user pulls down the handle to open the locker space 45. In FIG. 5C, the user can store personal items, and then in FIG. 5D the user closes the door 46 to lock up.

The wireless communication system comprises a cellular modem. The station apparatus further comprises a plurality of gate latches, each of the plurality of gate latches utilized to open the bar of each of the plurality of slots. The station apparatus further comprises a power source. The station apparatus further comprises a plurality of waterproof signs. Each of the surfboards is preferably at least eight feet in length. However, those skilled in the pertinent art will recognize that the surfboard can be of any size or shape without departing from the scope and spirit of the present invention. The station apparatus preferably has an area ranging from 10 square feet to 15 square feet. The fin of each of the surfboards is restrained by the bar of each of the slots. However, those skilled in the pertinent art will recognize that the station apparatus can have an area less than or greater than the preferred area without departing from the scope and spirit of the present invention. The base is designed to hold each of the surfboards at an angle to prevent forward movement. Each slot preferably has a waterproof sign with a QR code.

One preferred embodiment is a surf board rental station. Each station preferably holds 4, 8 feet tall, beginner wave storm surfboards 15. Preferably each station has a total area of approximately 4×3 square feet and is approximately 9 feet tall. Each slot 12 has a bar 13 over the surfboard fin 17 that helps to prevent theft. The boards are preferably held up by a base 11 that helps indicate fin 17 configuration and hold boards 15 at an angle, away from the slot gate so that boards 15 won't fall forward towards a new user when the slot 12 is unlocked. The frame is made of 80/20 struts. Station has 7 waterproof signs that help dress the frame: 2 large signs on the sides; 1 large sign in the front center; 4 small signs with QR codes next to the corresponding surfboard slot. The station apparatus is preferably powered by a lithium battery or power outlet. Those skilled in the pertinent art will recognize that other power sources may be utilized with the station apparatus without departing from the scope and spirit of the present invention. A microcontroller 21 is used for coordinating locks and sensors, 4 locks, 4 proximity sensors to detect lock status, 4 RFID sensors to detect RFIDs on boards. Onboard computing unit used to relay information from microcontroller to cellular modem. The cellular modem is used to send and receive signals from users' phone via a cellular network. A gate latch 14, as shown in FIGS. 3A-3B, is used to open the locked bar 13 over the sporting equipment. When the station is unlocked, the sound of the lock unlocking and the user's app indicate that the slot 12 is open.

Figure 6:
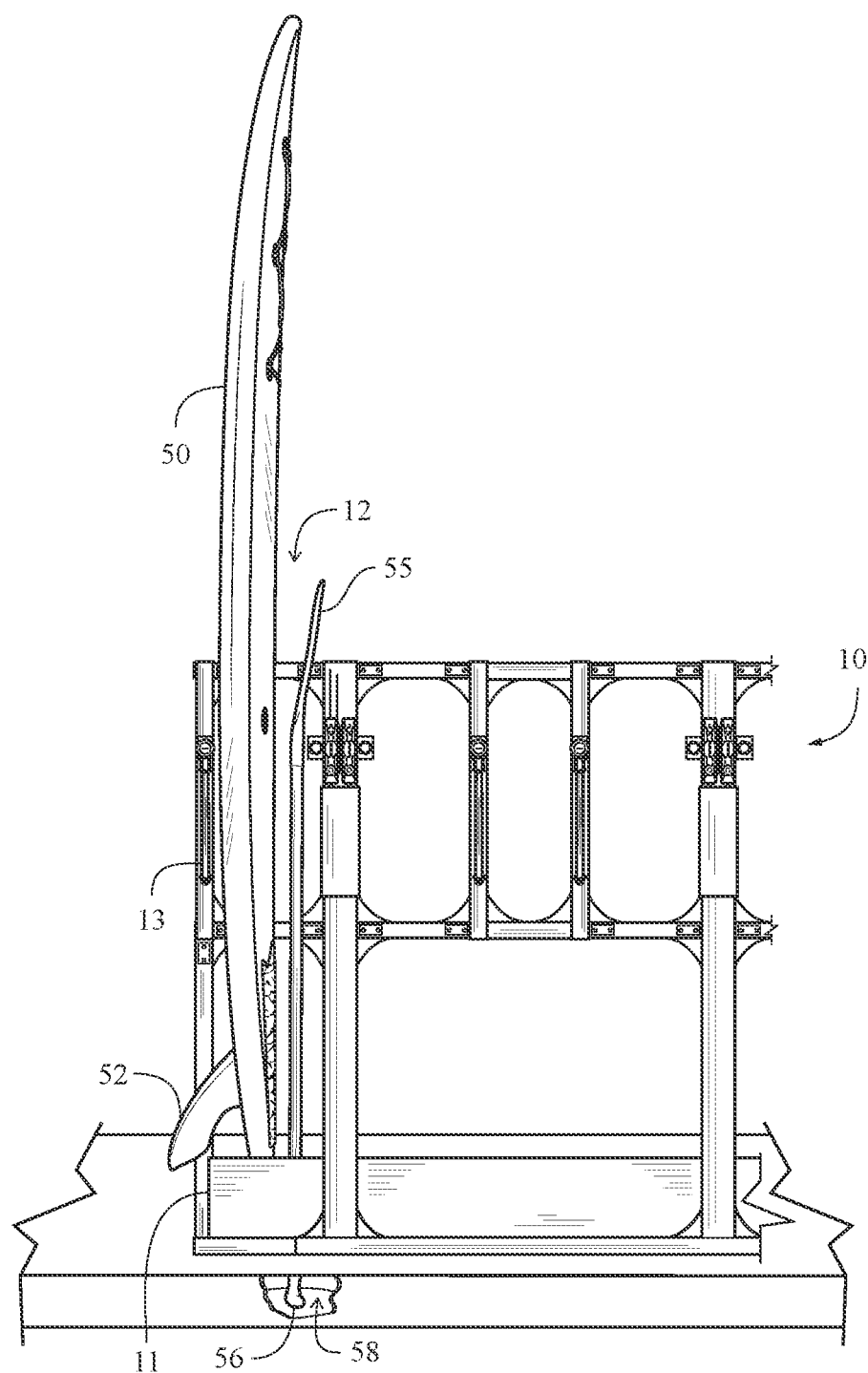
FIG. 6 front elevation view of an apparatus for automated sports equipment rentals with a paddleboard therein.
Figures 7, 7A, 7B:
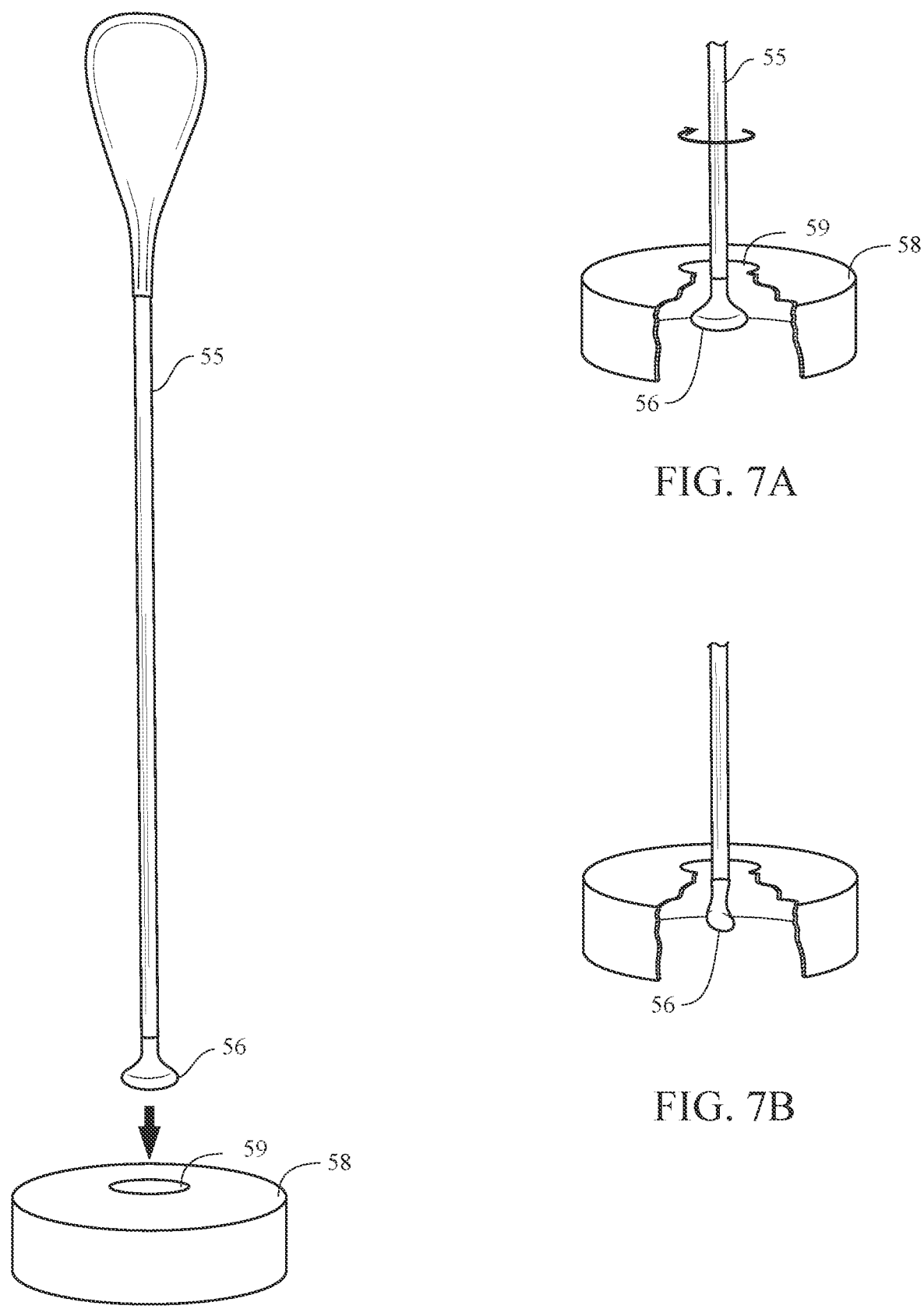
FIG. 7 is a top perspective view of an apparatus for automated sports equipment rentals with a paddle lock.
FIG. 7A is a detailed view of a paddle lock of FIG. 7.
FIG. 7B is a detailed view of a paddle lock of FIG. 7.
Figure 7C:
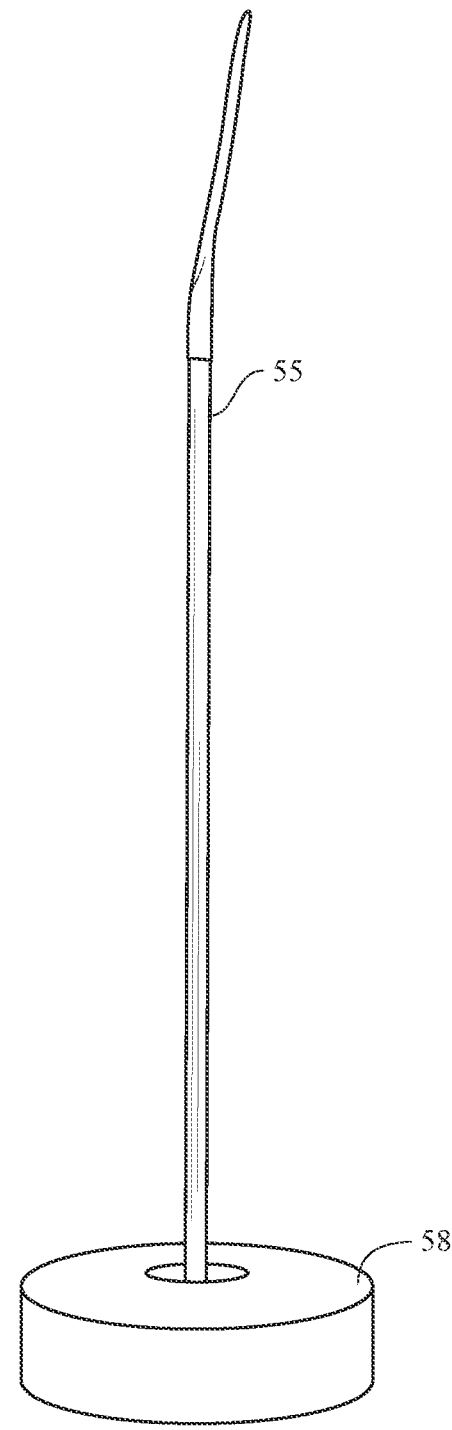
FIG. 7C is a top perspective view of a paddle lock for automated sports equipment rentals in a locked position.

Another embodiment is a stand-up paddle board (SUP) rental station with a lock 58 for a paddle 55, as shown in FIGS. 6-7C. Each slot 12 has a bar 13 over the fin 52 of the SUP 50 and a lock 58 for the paddle 55 that helps to prevent theft. The paddle 55 is inserted, as shown in FIG. 7, into a lock 58 that has a groove 59 sized to a paddle grip 56. Once the grip 56 is inside the lock 58, the paddle is rotated, as shown in FIG. 7A, to a locked position, as shown in FIG. 7B. FIG. 7C shows the position of the paddle when locked.

A RASPBERRY PI Onboard Computing Unit is a preferred onboard computing unit (microcontroller). A HOLOGRAM NOVA cellular modem is a preferred cellular modem. A LOKK Latch is a preferred gate latch.

A mobile app controlled automation and mechanical integration unlocks sporting equipment, allows for payment processing, and allows for obtaining a liability waiver. A server is preferably in communication with the mobile app. A database is in communication with the server to store accounts, client data, equipment data, locations and the like.

In an alternative embodiment, the station apparatus can be monitored, serviced, updated remotely. Station data and performance can also be monitored virtually. Both are additional value-add to conventional board rental business models.

An operating system controls the execution of other computer programs, running of the PSO platform, and provides scheduling, input-output control, file and data management, memory management, and communication control and related services. The operating system may be, for example WINDOWS (available from Microsoft, Corp. of Redmond, Wash.), LINUX or other UNIX variants (available from Red Hat of Raleigh, N.C. and various other vendors), Android and variants thereof (available from Google, Inc. of Mountain View, Calif.), APPLE OS X, iOs and variants thereof (available from Apple, Inc. of Cupertino, Calif.), or the like.

The method described in connection with the embodiments disclosed herein is preferably embodied directly in hardware, in a software module executed by a processor, or in a combination of the two. A software module preferably resides in flash memory, ROM memory, EPROM memory, EEPROM memory, RAM memory, registers, a hard disk, a removable disk, a CD-ROM, or any other form of storage medium known in the art. An exemplary storage medium is preferably coupled to the processor, so that the processor reads information from, and writes information to, the storage medium. In the alternative, the storage medium is integral to the processor. In additional embodiments, the processor and the storage medium reside in an Application Specific Integrated Circuit (ASIC). In additional embodiments, the processor and the storage medium reside as discrete components in a computing device. In additional embodiments, the events and/or actions of a method reside as one or any combination or set of codes and/or instructions on a machine-readable medium and/or computer-readable medium, which are incorporated into a computer software program.

In additional embodiments, the functions described are implemented in hardware, software, firmware, or any combination thereof. If implemented in software, the functions are stored or transmitted as one or more instructions or code on a computer-readable medium. Computer-readable media includes both computer storage media and communication media including any medium that facilitates transfer of a computer program from one place to another. A storage medium is any available media that is accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection is termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and BLU-RAY disc where disks usually reproduce data magnetically, while discs usually reproduce data optically with lasers. Combinations of the above should also be included within the scope of computer-readable medium.

A computer program code for carrying out operations of the Present Invention is preferably written in an object oriented, scripted or unscripted programming language such as C++, C#, SQL, Java, Python, Javascript, Typescript, PHP, Ruby, or the like.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MIMS, GPRS and Flash. The databases used with the system preferably include but are not limited to MSSQL, Access, MySQL, Oracle, DB2, Open Source DBs and others. Operating system used with the system preferably include Microsoft 2010, XP, Vista, 2000 Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS"), or other similar protocols. The protocol at the server is preferably HTTPS.

Components of a server includes a CPU component, a graphics component, memory, non-removable storage, removable storage, Network Interface, including one or more connections to a fixed network, and SQL database(s). Included in the memory, is an operating system, a SQL server or other database engine, and computer programs/software.

A mobile communication devices utilized with the present invention preferably include mobile phones, smartphones, tablet computers, PDAs and the like. Examples of smartphones include the IPHONE® smartphone from Apple, Inc., BLACKBERRY® smartphones from Research In Motion, the DROID® smartphone from Motorola Mobility Inc., GALAXY S® smartphones from Samsung Electronics Co., Ltd, and many more. Examples of tablet computing devices include the IPAD® tablet from Apple Inc., and the GALAXY TAB® tablet from Samsung Electronics Co., Ltd.

A typical mobile communication device includes an accelerometer, I/O (input/output), a microphone, a speaker, a GPS chipset, a Bluetooth component, a Wi-Fi component, a 4G/5G component, RAM memory, a main processor, an OS (operating system), applications/software, a Flash memory, SIM card, LCD display, a camera, a power management circuit, a battery or power source, a magnetometer, and a gyroscope.

A mobile communication service provider (aka phone carrier) of the customer such as VERIZON, AT&T, T-MOBILE, and the like mobile communication service providers, provide the communication network for communication to the mobile communication device of the end user.

Wireless standards include 802.11a, 802.11b, 802.11n, AX.25, 3G, CDPD, CDMA, GSM, GPRS, radio, microwave, laser, Bluetooth, 802.15, 802.16, and IrDA.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this

We claim as our invention the following:

1. A system for automated sports equipment rentals, the system comprising:
    a station apparatus comprising a microcontroller, a plurality of proximity sensors, a plurality of a RFID sensors, a wireless communication mechanism, a base and a plurality of slots, each slot of the plurality of slots comprising a retention member;
    a plurality of sports equipment positioned within the station apparatus, each equipment of the plurality of sports equipment comprising a RIFD; and
    a mobile application configured to operate on a mobile device;
    wherein the mobile application configured to assign and unlock an equipment of the plurality of sports equipment from the station apparatus;
    wherein each of the plurality of proximity sensors is configured to detect a lock status;
    wherein each of the plurality of RFID sensors is configured to detect the RFID on equipment of the plurality of sports equipment.

2. The system according to claim 1 wherein the sports equipment is paddle boards or surfboards.

3. The system according to claim 1 wherein the station apparatus further comprises a plurality of gate latches, and each of the plurality of gate latches is utilized to open the retention member of each of the plurality of slots.

4. The system according to claim 2 wherein the sports equipment is paddle boards, and the station apparatus further comprises a plurality of grooves in the base, wherein a grip of a paddle board is placed in a groove of the plurality of grooves, and a paddle of the paddle board is placed in a slot of the plurality of slots.

5. The system according to claim 1 wherein the station apparatus has an area ranging from 10 square feet to 15 square feet.

6. The system according to claim 3 wherein the sports equipment is surfboards and a fin of each of the plurality of surfboards is restrained by the retention member of each of the plurality of slots.

7. The system according to claim 1 wherein the station apparatus further comprises a plurality of integrated lockers.

8. An apparatus for automated surfboard rentals, the apparatus comprising:
    a microcontroller;
    a plurality of proximity sensors;
    a plurality of a RFID sensors;
    a wireless communication mechanism;
    a base; and
    a plurality of slots, each slot of the plurality slots comprising a bar;
    wherein each of the plurality of slots is designed to retain a surfboard;
    wherein the microcontroller is configured to receive a command from a mobile application to assign and unlock a surfboard from the apparatus;
    wherein each of the plurality of proximity sensors is configured to detect a lock status;
    wherein each of the plurality of RFID sensors is configured to detect a RFID on a surfboard.

9. The apparatus according to claim 8 further comprising a plurality of gate latches, each of the plurality of gate latches utilized to open the bar of each of the plurality of slots.

10. The apparatus according to claim 8 wherein the apparatus has an area ranging from 10 square feet to 15 square feet.

11. The apparatus according to claim 8 wherein the bar of each of the plurality of slots is designed to restrain a fin of a surfboard.

12. The apparatus according to claim 8 wherein the base is designed to hold each of a plurality of surfboards at an angle to prevent forward movement.

13. The system according to claim 1 wherein the station apparatus further comprises a plurality of integrated lockers.

14. An apparatus for automated sports equipment rentals, the apparatus comprising:
    a microcontroller;
    at least one proximity sensor;
    at least one RFID sensor;
    a wireless communication mechanism;
    a base; and
    at least one slot comprising a retention member;
    wherein the at least one slot is designed to retain sports equipment;
    wherein the microcontroller is configured to receive a command from a mobile application to assign and unlock sports equipment from the apparatus;
    wherein the at least one proximity sensor is configured to detect a lock status;
    wherein the at least one RFID sensor is configured to detect a RFID on a sports equipment wherein the station apparatus has an area ranging from 10 square feet to 15 square feet.

15. The apparatus according to claim 14 wherein the sports equipment is a paddle board or a surfboard.

16. The apparatus according to claim 14 wherein the station apparatus further comprises at least one gate latch utilized to open the retention member of the at least one slot.

17. The apparatus according to claim 15 wherein the sports equipment is a paddle board, and the station apparatus further comprises at least one groove in the base, wherein a grip of a paddle board is placed in the groove, and a paddle of the paddle board is placed in the at least one slot.

18. The apparatus according to claim 15 wherein the sports equipment is a surfboard and a fin of the surfboard is restrained by the retention member of the slot.

19. The apparatus according to claim 14 wherein the station apparatus further comprises a plurality of integrated lockers.

* * * * *